Nov. 3, 1925.
R. E. CHOATE
SNOWPLOW
Filed Dec. 24, 1923
1,560,141
3 Sheets-Sheet 1
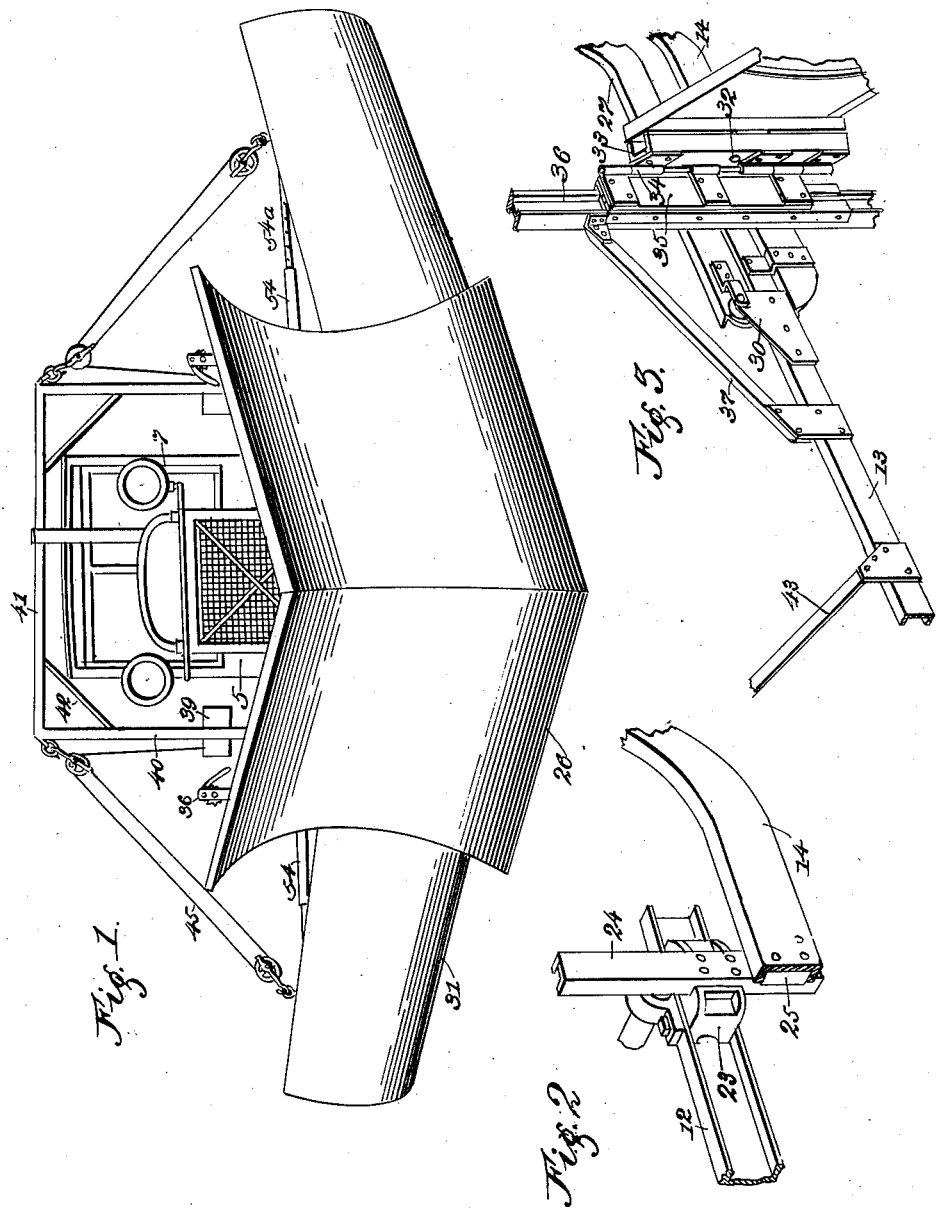

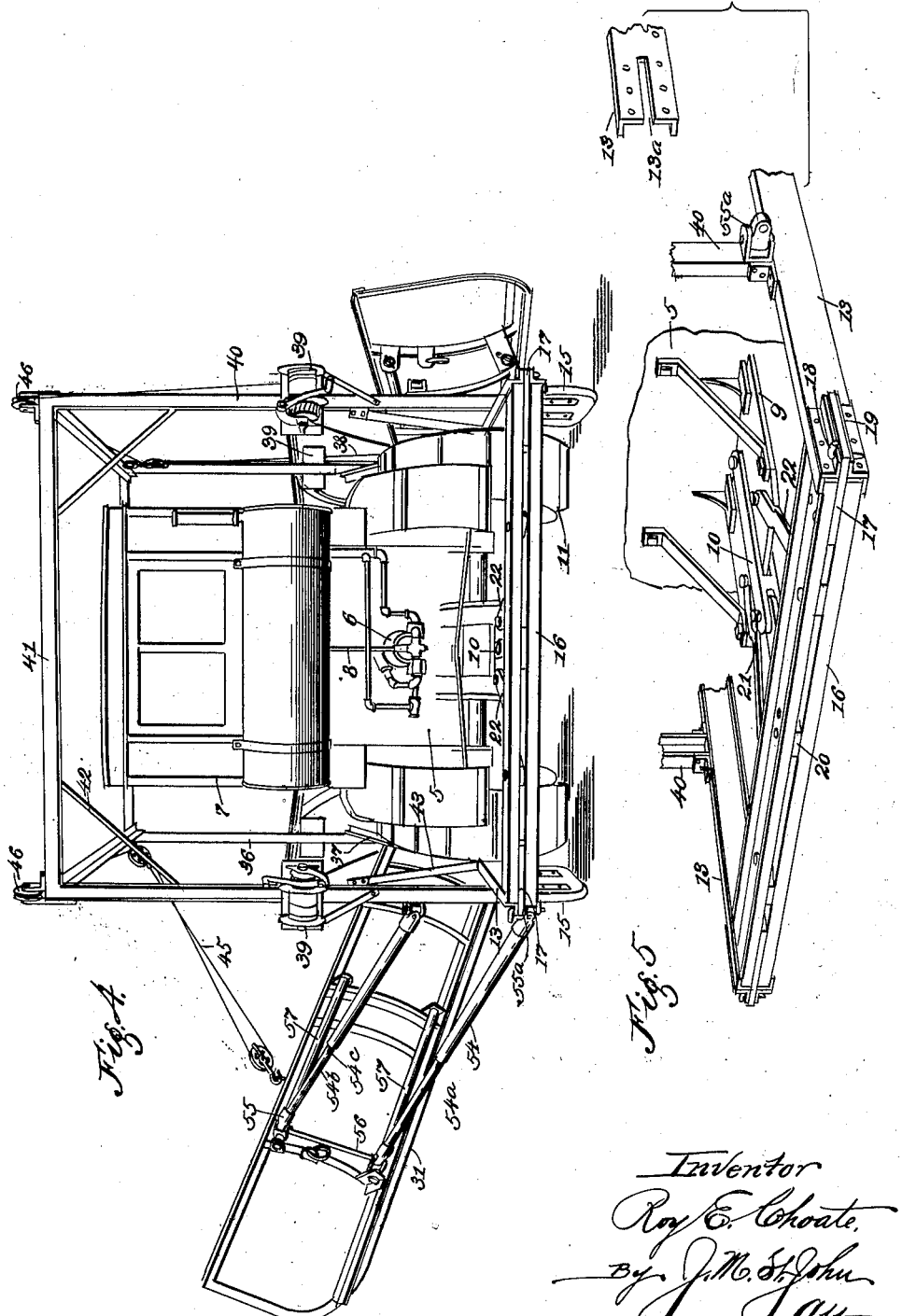

Nov. 3, 1925.
R. E. CHOATE
1,560,141
SNOWPLOW
Filed Dec. 24, 1923  3 Sheets-Sheet 3
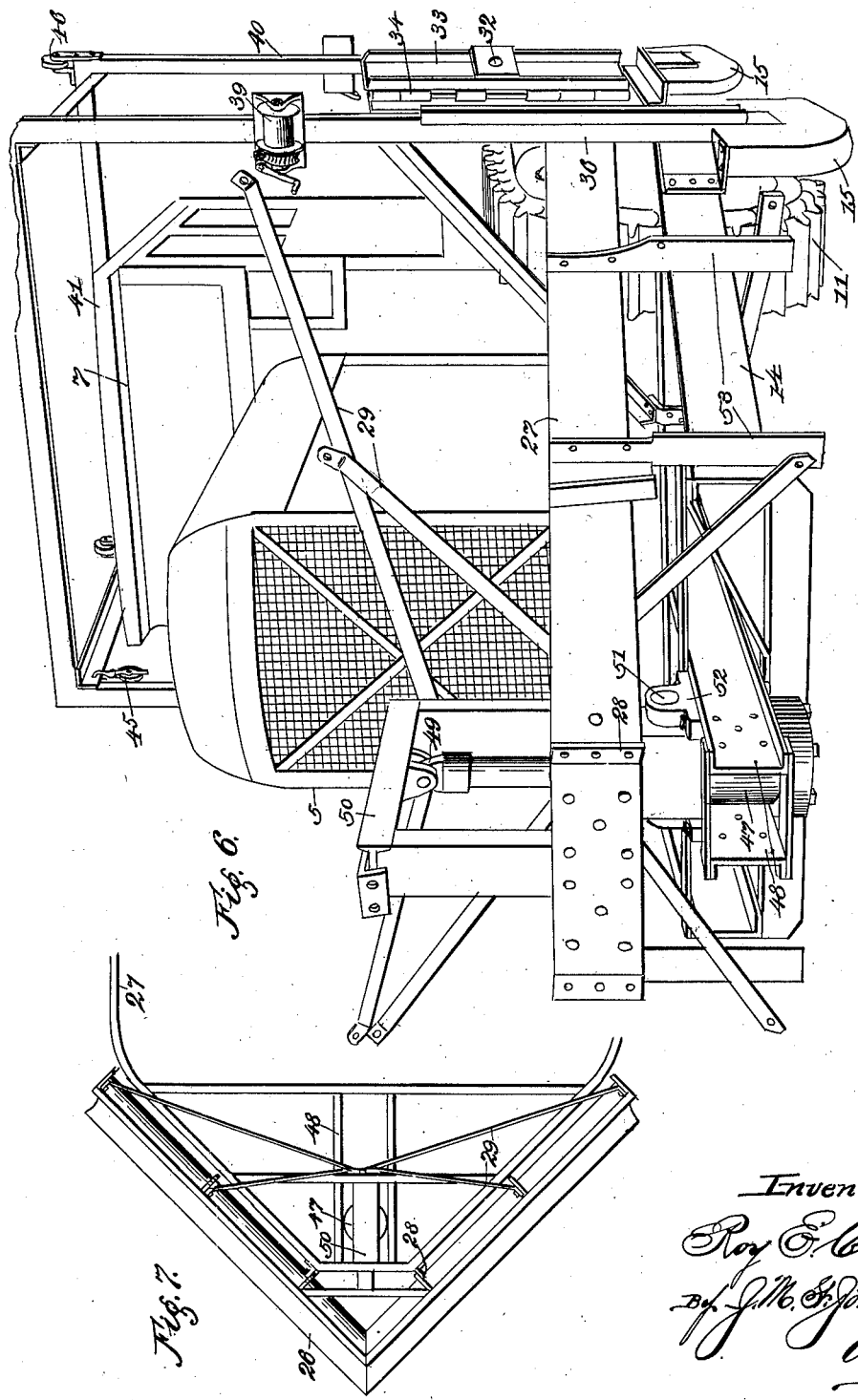

Patented Nov. 3, 1925.

1,560,141

UNITED STATES PATENT OFFICE.

ROY E. CHOATE, OF CEDAR RAPIDS, IOWA.

SNOWPLOW.

Application filed December 24, 1923. Serial No. 682,578.

*To all whom it may concern:*

Be it known that I, ROY E. CHOATE, a citizen of the United States, residing at Cedar Rapids, in the county of Linn and State of Iowa, have invented certain new and useful Improvements in Snowplows, of which the following is a specification.

This invention relates to heavy duty snow plows, such as are used for clearing snow from streets and driveways, and the object of the invention is to produce a snow plow for the purpose, which is adapted for severe service, is adjustable as to height and width of plowing, and may be easily collapsed laterally, at either or both sides, to allow for the flow of traffic.

Other objects will appear in connection with the description following, in which the invention is fully set forth, reference being had to the accompanying drawing, in which:—

Fig. 1 is a front view in perspective, showing the plow in position for wide plowing.

Fig. 2 shows details of one of the side abutments for the plow-supporting frame.

Fig. 3 shows details of the pivotal mounting of the central and side plows.

Fig. 4 is a rear view in perspective, showing one of the side plows extended and the other folded close to the tractor.

Fig. 5 shows details of the draft connection between the main frame of the plow and the tractor.

Fig. 6 is a front view in perspective, with the plows removed, and shows the general construction of the apparatus.

Fig. 7 is a plan view of the central, wedge plow and its carrying frame.

As herein illustrated the snow plow is shown as attached to a powerful tractor of the creeper or "caterpillar" type. The nature of the invention is such, however, that with slight modification in structure it may be readily attached to other tractors of either this or the ordinary drive-wheel type. As a preliminary it may be stated that the tractor mentioned is provided with apparatus for operating a hydraulic lifting jack, which type of hoisting apparatus is well adapted for the heavy service required of it. This is indicated in Fig. 4, the rear end of the tractor 5 being provided with a hydraulic pump 6 driven by the tractor power plant, and controlled by the operator in the tractor-cab 7 by means of suitable valve-controlling apparatus indicated by the rod 8. It has not been deemed necessary to illustrate this hydraulic mechanism in detail, as it is in general use, and with the exception of an adaptation of the ram to the present purpose, as will appear presently, it forms no part of this invention.

It is to be noted further that the rear end of the tractor is provided with suitable draft apparatus in the form of a heavy plate 9 anchored to the rear end, and a draw-bar 10 attached thereto. The attachment of the plow frame to this draft apparatus will be fully set forth hereafter. The creepers 11 of the tractor are journaled to side frames 12 (Fig. 2), and to these are attached abutments to take the side-thrust of the adjacent plow frames, as will be fully set forth in detail.

The main supporting frame for the plows (central wedge and diagonal side wings) has a pair of side sills 13 terminating forwardly in an A-frame 14. To this frame is securely attached at each side a pair of runners 15, which in the main carry the frame and superstructure. The side and forward part of the frame are rigidly connected, but the rear cross-sill 16 is detachable, so that when it is removed the tractor may be driven forwardly into the frame, which is then coupled to it. Referring to Fig. 5 it will be seen that the rear cross-sill is composed of a pair of strong beams fitting into the side sills, and provided at each end with an interposed abutment plate 17. These fit into seats 13ª, and are held detachably in place by pins 18 passing through the abutment plates and adjacent angle-plates 19. To the middle of the cross-sill is secured another plate 20, projecting forwardly, and adapted to couple by a suitable pin or bolt 21 with the draw-bar above mentioned. Two auxiliary draw-bars 22 are also provided, connecting the rear cross-sill diagonally with the tractor draw-plate, and serving not only to reinforce the draft, but to brace the frame in relation to the tractor.

There being no rigid connection of the plow with the tractor, the two may act independently with respect to the roadway, and either may rock up and down as conditions may require. The plow is held to its true course laterally, however by abutment guides above referred to. One of these is shown in Fig. 2, it being understood that there is one on each side of the tractor. The device consists of a casting 23 secured to the beam 12, and provided with a vertical post 24 to act as a guide for the main frame in moving up or down, and to confine its movement sidewise. A suitable block 25 fits in the channel of the main frame, and gives a good wearing surface opposed to the guide-post.

The wedge-shaped central plow 26 is rigidly attached to an auxiliary A-frame 27 by lugs 28 and braces 29. The frame itself formes a strong bail, the rearwardly extending legs of which are hinged to upstanding lugs 30 secured to the main or sub-frame. The apparatus for elevating the plow will be described presently.

The diagonal wing-plows 31 are hinged at 32 to swing up and down, and the members 33 to which the plows are hinged, are themselves hinged at 34 to swing horizontally. The latter hinge forms part of a cross-head 35 mounted slidably on a guide-post 36 secured to the sub-frame, and suitably braced at 37. A cable 38 attached to the cross-head serves for lifting the same and the connected front end of the side plow by means of a winch 39 attached to the post. This winch is preferably of the worm-gear and drum type, as shown in the principal figures of the drawing, but may be a simple ratchet and lever winch, as indicated in Fig. 1. The posts carrying the crossheads are connected overhead, and form a stable gallows or derrick to carry the weight of the suspended plows. A similar derrick near the rear is composed of two vertical posts 40 and a connecting cross-beam 41, with suitable braces 42 and 43, and serves for the elevation of the side-plows at the rear by means of a winch 39 attached to each post. The tackle 45 is however attached to the front derrick, for the most effective lifting, the cable being run over sheaves 46 at the top of the rear derrick.

The preferred lifting apparatus for the heavy front plow and connected frame is a hydraulic jack 47 mounted on parallel beams 48 of the sub-frame. Its ram connects at 49 with a heavy stirrup or yoke 50 secured to the tilting frame to which the plow is attached. As this point of connection moves in an arc the jack is provided with trunnions 51 journaled in bearings 52, as shown in Fig. 6. It will be noted also in the same figure that the tilting frame is provided with depending legs 53, which serve as lateral abutments against the side-thrust of the adjacent sub-frame, and thus stay the tilting frame laterally against the heavy side-strains to which the plow is at times subjected.

The side-plows are held outward to any desired angle by struts 54, preferably a pair for each plow. These are made to telescope, preferably by the use of tubular material, the member 54$^a$ of each pair being pierced at 54$^b$ to receive pins 54$^c$. As the plows are adapted to take a compound movement, the connection of the struts with them and with the posts of the rear derrick is by universal joints 55 and 55$^a$, respectively. The former are connected as a crosshead by a rod 56, and the joints themselves are mounted slidably of parallel guide-bars 57 secured at the ends to the ribs of the plows. This makes it possible to collapse either or both plows, and swing them in close to the main frame, by sliding the crosshead forwardly, and permitting the struts to shorten telescopically. This is a matter of great convenience, as it admits of the movement of the apparatus through comparatively narrow spaces, and swinging either plow out of the way of passing traffic.

Having thus described my invention, I claim:

1. In a snow-plow, a main frame adapted to enclose a tractor, a tilting auxiliary frame carrying a centrally disposed plow, and hoisting apparatus adapted to raise and lower the tilting frame.

2. In a snow-plow, a main frame adapted to enclose a tractor, a tilting auxiliary frame carrying a centrally and forwardly disposed plow, a yoke attached thereto, and a hydraulic jack rockably mounted on the main frame, and connecting by its ram with said yoke.

3. In a snow-plow, a main frame having plow-supporting side sills, a derrick rising therefrom, a side plow having a pivotal connection at its front end with said frame, a horizontally swinging member forming the connecting medium between the pivot and the frame, means carried by the derrick for hoisting the plow, and a strut connecting the plow and the frame.

4. In a snow-plow, a main frame having plow supporting side sills, a derrick rising therefrom, a crosshead slidable up and down on said derrick, a horizontally swinging hinged member carried by the crosshead, a plow hinged forwardly to said hinged member so as to swing up and down, means carried by the derrick for lifting the plow on its pivot, independent means carried by the derrick for elevating the crosshead, and a strut interposed between the plow and main frame.

5. In a snow-plow, a main frame having side sills, a plow hinged to swing horizontally with respect to said frame, and an endwise adjustable strut connecting the plow and frame, whereby the plow may be disposed at any desired angle to said frame.

6. In a snow-plow, a main frame having side sills, a plow hinged forwardly to the frame structure, so as to swing horizontally, and an adjustable and collapsible strut connecting the plow with the frame, whereby the plow may be held at any desired angle, and folded close to the frame.

7. In a snow-plow, a main frame having side sills, a plow hinged forwardly to the frame structure so as to swing toward and from it at the rear, a longitudinal guide carried by said plow, and a telescopic strut hingedly connecting with the frame, and hingedly and slidably connecting at its other end with said guide.

8. In a snow-plow, the combination with a main frame and its superstructure, of a side plow connecting forwardly with the frame structure by a universal joint, an endwise adjustable strut connecting the plow rearwardly with the frame structure, and universal joints connecting the strut with the plow and the frame.

9. In a snow-plow, the combination with a main frame, of a side-plow connecting forwardly with the frame by a universal joint, a pair of longitudinal guides carried by the plow, a crosshead slidable thereon, a pair of endwise adjustable struts disposed between the plow and frame, and universal joints connecting said struts at one end with the frame, and the other end with the crosshead.

10. A snow plow, comprising the combination of a V-shaped nose, a rearwardly extending frame secured thereto and designed to receive a tractor, wings pivotally mounted on the frame behind the nose, guideways on the frame, blocks secured to the pivots and slidable in the guideways to raise and lower the forward ends of the wings.

In testimony whereof I affix my signature.

ROY E. CHOATE.